(No Model.)
S. J. FORD & R. BAIRD.
FIRE KINDLER.
No. 432,934. Patented July 22, 1890.
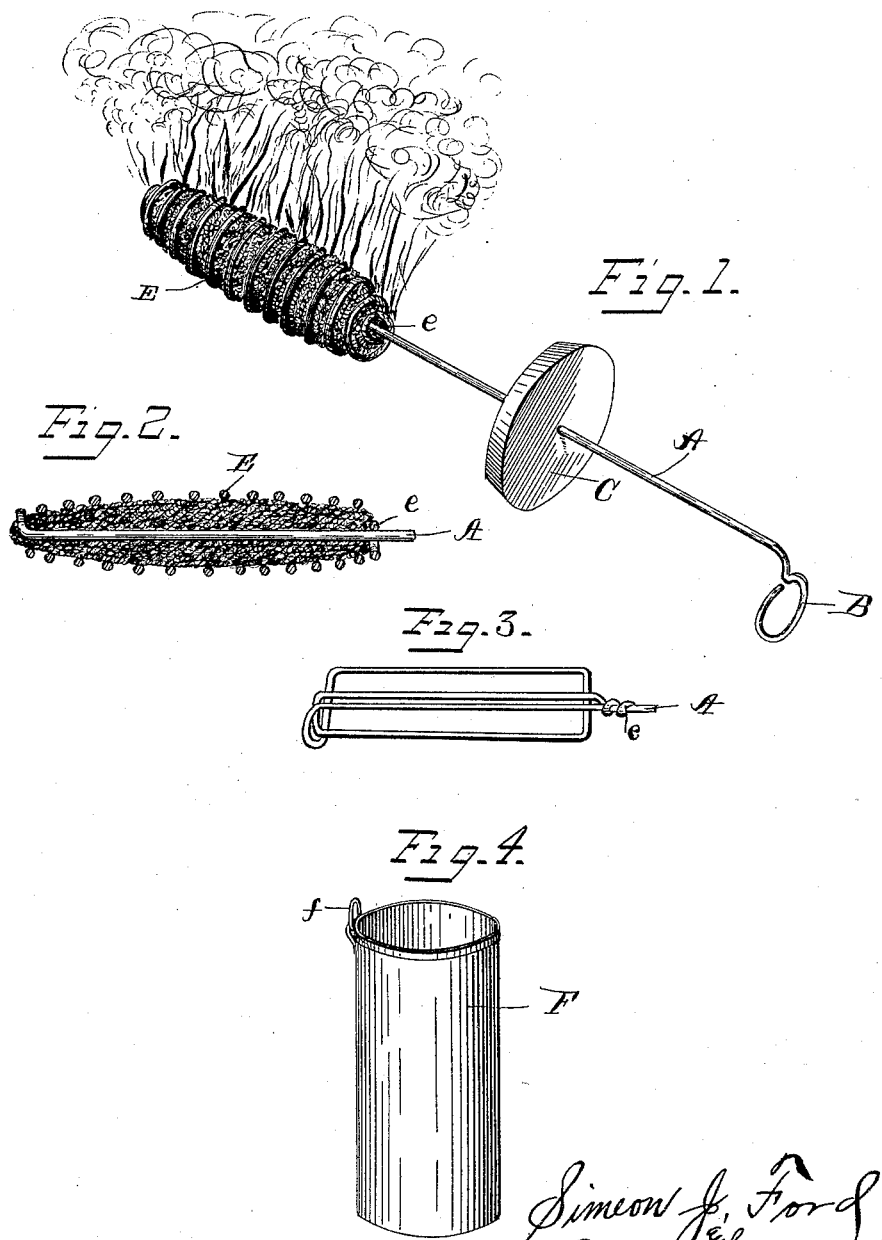

UNITED STATES PATENT OFFICE.

SIMEON JASPER FORD AND ROBERT BAIRD, OF PLACERVILLE, CALIFORNIA.

FIRE-KINDLER.

SPECIFICATION forming part of Letters Patent No. 432,934, dated July 22, 1890.

Application filed April 19, 1887. Renewed February 6, 1890. Serial No. 339,448. (No model.)

*To all whom it may concern:*

Be it known that we, SIMEON JASPER FORD and ROBERT BAIRD, citizens of the United States, residing at Placerville, in the county of El Dorado and State of California, have invented a new and useful Improvement in Fire-Kindlers, of which the following is so full, clear, and exact a description as will enable others skilled in the art to which my invention appertains to make and use the same, reference being had to the accompanying drawings, in which—

Figure 1 is a perspective of our improved kindler. Fig. 2 is a detailed longitudinal sectional view of the lighting end of the torch or kindler. Fig. 3 is a modification showing another means of securing the fiber to the kindler. Fig. 4 is a detail view of the cup or reservoir which contains the liquid which is used with our improved fire-kindler.

The object of our invention is to produce a fire-kindling device to be used in lighting fires, to kindle brush heaps, to burn worm-nests, form temporary torches, or for any other analogous purpose for which lights may be used.

Another object of our invention is to produce a kindler which will be practically indestructible.

Another object of our invention is to produce a fire-kindler which will be so simple and cheap of construction as to bring it clearly within the reach of the masses of the people who most need this sort of device.

The device may be used to advantage in kindling wood or coal fires, without shavings, paper, or kindling-wood of any kind.

The kindler is a safe, economical, and useful device. It can be used to advantage to stew a dish of oysters, make a pot of tea or coffee without the trouble of kindling a fire in a stove, and in case of sudden sickness at night it can be used to advantage in preparing hot drinks and lotions on short notice.

In the accompanying drawings, A designates the handle of our improved kindler, which is provided at its outer end with a loop B, and which is also provided with a perforated block or cover C, which slides loosely up and down on the handle. The handle in the device as we now construct it is made of wire, which extends from the loop down to the lower outer end of the lighter, where it is bent back and coiled around its back, up to a distance, say, of one-third of the length of the handle, in the shape of a coil or spiral. It is not twisted closely upon itself, but sufficient distance is left between the main wire and the coil to permit of the filling of this coil with asbestus fiber or other suitable packing, and the upper end of the coil E is bent snugly down at its upper end, forming a hook $e$, which engages with the straight portion A of the handle and holds the coil in place.

The sliding cover or disk C is adapted to be moved up close to the loop B when the torch is lighted, and is adapted to be shoved down close to the point where the coil terminates in the hook $e$, where it will form a cover for the store-can F, in which is stored the fluid with which the kindler is saturated when it is desired to make a fire. This can may be made of tin, copper, brass, wood, or any other suitable material, and should be provided with a suitable loop $f$, by which to hang it up. The can should be filled with oil, gasoline, or rose-oil, whichever one may be most convenient and most readily and cheaply obtained. For general purposes we find that ordinary petroleum serves every purpose.

We use as a packing or filling material in our lighter pure asbestus fiber. This may be replaced by amianthus or fine wire without departing from the general spirit of our invention.

The operation of our device is as follows: Having filled the can and suspended it and placed the lighting portion of the lighter in the can, pushing the disk down until it closes the can the upper end of the handle is grasped and the lighter pulled out of the can, and the cover or disk pushed up close to the top or loop B; then touch a match to the lighting end of the lighter and the kindler will instantly flame up. Place this beneath your fire or beneath the material which you wish to ignite and your fire will be soon burning hotly. If the wood is wet or coal very poor, it may be well to add a little coarse wood; but in most instances we find this entirely unnecessary.

A lighter made in the manner described and shown will be very light and durable and not likely to get out of order, and with proper usage will last a lifetime.

In the device shown in Fig. 3 the wire, instead of being coiled back on the main wire A, is simply bent down to the lower point, where it is coiled once and then brought back up over the main wire, then down again, and back again, where it is secured to the handle.

We are aware that fire-kindlers formed of wire and consisting of a handle having at its end a receptacle for asbestos or absorbent material is not new. We therefore do not wish to be understood as claiming, broadly, such a device; but What we believe to be new and desire to secure by Letters Patent, and what we therefore claim, is—

A fire-kindler of the character described, consisting of a single piece of wire bent at its lower end into a series of coils around the central part and terminating in a loop around said central part, thereby forming a chamber which is filled with asbestos, substantially as described.

In testimony that we claim the above as our invention we hereto set our hands in the presence of two witnesses.

SIMEON JASPER FORD.
ROBERT BAIRD.

Witnesses:
GEO. H. INGHAM,
R. ALDIRSON, Jr.